United States Patent
Sugimoto et al.

[11] Patent Number: 6,064,447
[45] Date of Patent: May 16, 2000

[54] PURE RED COLOR DETECTION CIRCUIT AND COLOR COMPENSATION CIRCUIT USING THE SAME

[75] Inventors: Hiroko Sugimoto, Hirakata; Atsuhisa Kageyama, Ibaraki; Masahiro Takeshima; Minoru Kawabata, both of Takatsuki, all of Japan

[73] Assignee: Matsushita Electric Industrial Co., Ltd., Osaka, Japan

[21] Appl. No.: 09/035,684

[22] Filed: Mar. 5, 1998

[30] Foreign Application Priority Data

Mar. 6, 1997 [JP] Japan .................................. 9-051339

[51] Int. Cl.$^7$ ...................................................... H04N 9/64
[52] U.S. Cl. ........................... 348/649; 348/650; 348/679; 348/703; 348/690; 382/162; 382/167
[58] Field of Search .................................... 348/643, 644, 348/645, 646, 647, 648, 649, 650, 651, 652, 655, 656, 679, 690, 712, 713, 703, 727, 30, 82, 130; 358/27, 28, 29; 382/162, 167; H04N 9/64, 5/21

[56] References Cited

U.S. PATENT DOCUMENTS

| | | | |
|---|---|---|---|
| 4,847,677 | 7/1989 | Music | 358/13 |
| 4,953,011 | 8/1990 | Mori | 348/30 |
| 5,134,465 | 7/1992 | Ohki et al. | 358/27 |
| 5,294,974 | 3/1994 | Naimpally et al. | 348/395 |
| 5,353,058 | 10/1994 | Takei | 348/363 |
| 5,418,575 | 5/1995 | Kaneko et al. | 348/645 |
| 5,428,385 | 6/1995 | Sakata | 348/82 |
| 5,555,022 | 9/1996 | Haruki et al. | 348/223 |
| 5,621,827 | 4/1997 | Uchiyama | 382/307 |
| 5,835,641 | 11/1998 | Sotoda | 348/169 |
| 5,838,465 | 11/1998 | Satou | 358/520 |
| 5,850,473 | 12/1998 | Andersson | 382/165 |
| 6,002,448 | 12/1999 | Hanai | 348/630 |

FOREIGN PATENT DOCUMENTS

| | | |
|---|---|---|
| 6-014334 | 1/1994 | Japan . |
| 7-095611 | 4/1995 | Japan . |

*Primary Examiner*—Mark R. Powell
*Assistant Examiner*—Wesner Sajous
*Attorney, Agent, or Firm*—Ratner & Prestia

[57] ABSTRACT

Red color saturation is increased and red color with higher purity can be reproduced by composing: a red color detection circuit 1 for detecting a red color signal having higher purity by inputting color differential signals (R-Y) and (B-Y) modulated by color subcarrier, subtracting the absolute value of the (B-Y) signal from the positive polarity component of the (R-Y) signal and removing the negative part of the subtracted signal; Y signal compensation block including: first gain controller 50b for controlling the output signal amplitude of red color detection circuit 1 and a subtracter 50a for subtracting the output signal of first gain controller 50b from a luminance signal Y; an (R-Y) signal compensation block including: second gain controller 51b for controlling the output signal amplitude of red color detection circuit 1 and an adder 51a for adding the output signal of second gain controller 51b and the input (R-Y) signal; and a (B-Y) signal compensation block including: third gain controller 52b for controlling the output signal amplitude of red color detection circuit 1, a polarity inverter 52c for inverting the output signal polarity of third gain controller 52b, a switch circuit 52d for selecting either input signal or output signal of polarity inverter 52c, a polarity discriminater 52e for discriminating the polarity of the input (B-Y) signal and controlling switch circuit 52d and an adder 52e for adding the output signal of switch circuit 52d and the input (B-Y) signal.

11 Claims, 8 Drawing Sheets

PURE RED COLOR DETECTION CIRCUIT AND COLOR COMPENSATION CIRCUIT USING THE SAME

FIELD OF THE INVENTION

The present invention relates to a pure red color detection circuit and a color compensation circuit compensating color differential signals by using it and emphasizing the red color.

BACKGROUND OF THE INVENTION

Television receivers having a high additional value have been developed according to their increased screen sizes and high quality color television receivers having a good red color reproducibility are desired.

Block diagrams of a red color detection circuit and a color compensation circuit in accordance with the prior art disclosed in Japanese Patent Laid-Open No.5-233667 are shown in FIGS. 6 and 8, respectively. The function of a red color detection circuit is explained below, referring to FIGS. 6 and 7.

FIG. 6 shows a block diagram of a red color detection circuit 101 of the prior art and FIG. 7 shows signal waveforms at various points of red color detection circuit 101. Red color detection circuit 101 includes an absolute value outputting circuit 101b, a subtracter 101c and a limiter 101d. In FIG. 7, waveforms A and B are color differential signals (R-Y) and (B-Y), respectively which are input to red color detection circuit 101 and the color differential signal (R-Y) is behind the color differential signal (B-Y) by 90 degrees in phase. An absolute value B-Y is made from the input color differential signal (B-Y) at absolute value outputting circuit 101b and is output (waveform C) and is input to subtracter 101c. Subtracting the output of absolute value outputting circuit 101b B-Y (waveform C) from color differential signal (R-Y) (waveform A) at subtracter 101c (waveform D) and only a positive part is outputted from limiter 101d (waveform E).

Because this signal exists near the phase of 90 degrees, the detected output is a signal corresponding to a red color in the input chrominance signal.

The function of a color compensation circuit of the prior art is explained below, referring to FIG. 8. The color compensation circuit includes red color detection circuit 101, an amplitude control circuit 102 for a color differential signal (R-Y) and another amplitude control circuit 103 for a color differential signal (B-Y). A color differential signal (R-Y) and red color detected signal (waveform E) in FIG. 7 output from red color detection circuit 101 are supplied to amplitude control circuit 102 and the color differential signal (R-Y) is controlled by the red color detected signal so that the amplitude decreases. Also a color differential signal (B-Y) and the red color detected signal output from red color detection circuit 101 are supplied to amplitude control circuit 103 and also the color differential signal (B-Y) is controlled by the red color detected signal so that the amplitude decreases. Thus, suppressing a signal having a large red component prevents red color from saturation.

This circuit, however, aims to prevent red color saturation and a different kind of apparatus is necessary for improving red color reproducibility which is intended in the present invention. The present invention detects a signal closer to a pure red color in a red color detection circuit and decreases a Y/C ratio, emphasizes a red color without saturating the red color and as a result, improves red color reproducibility by decreasing the luminance signal Y by the red color detection signal and bringing a color phase of the chrominance signal C closer to a red color by the red color detection signal in the color compensation circuit.

SUMMARY OF THE INVENTION

A pure red color detection circuit of the present invention slices a subcarrier modulated color differential signal (R-Y) at a designated level at a slice circuit, generates an absolute value signal of a subcarrier modulated color differential signal (B-Y) at an absolute value outputting circuit, subtracts the absolute value B-Y from the sliced signal at a subtracter, takes out only a positive part of the subtracted signal at a limiter and outputs. The output signal is a signal having a narrow phase range near 90 degrees in the chrominance signal and as a result, a pure red color is detected.

A color compensation circuit of the present invention includes the above mentioned pure red color detection circuit, a Y signal compensation block, an (R-Y) signal compensation block and a (B-Y) signal compensation block and decreases a Y/C ratio, makes the chrominance signal containing a red color signal higher than a designated level close to a pure red color, emphasizes the red color without saturation and can improve red color reproducibility by outputting a luminance signal Y' which is made by subtracting the pure red signal detected at the pure red detection circuit from the input luminance signal Y, at the Y signal compensation block, outputting a color differential signal (R-Y)' which is made by adding the pure red signal detected at the pure red color detection circuit to the input (R-Y) signal, at the (R-Y) signal compensation block and outputting a color differential signal (B-Y)' which is made by subtracting the pure red signal detected at the pure red detection circuit from the input color differential signal (B-Y), at the (B-Y) signal compensation block.

BRIEF DESCRIPTION OF THE DRAWINGS

FIG. 4 shows color phase coordinates explaining how to rotate a vector of a chrominance signal close to an (R-Y) axis at a color compensation circuit in accordance with an exemplary embodiment of the present invention.

PREFERRED EMBODIMENTS OF THE INVENTION (First exemplary embodiment)

Figure 1:
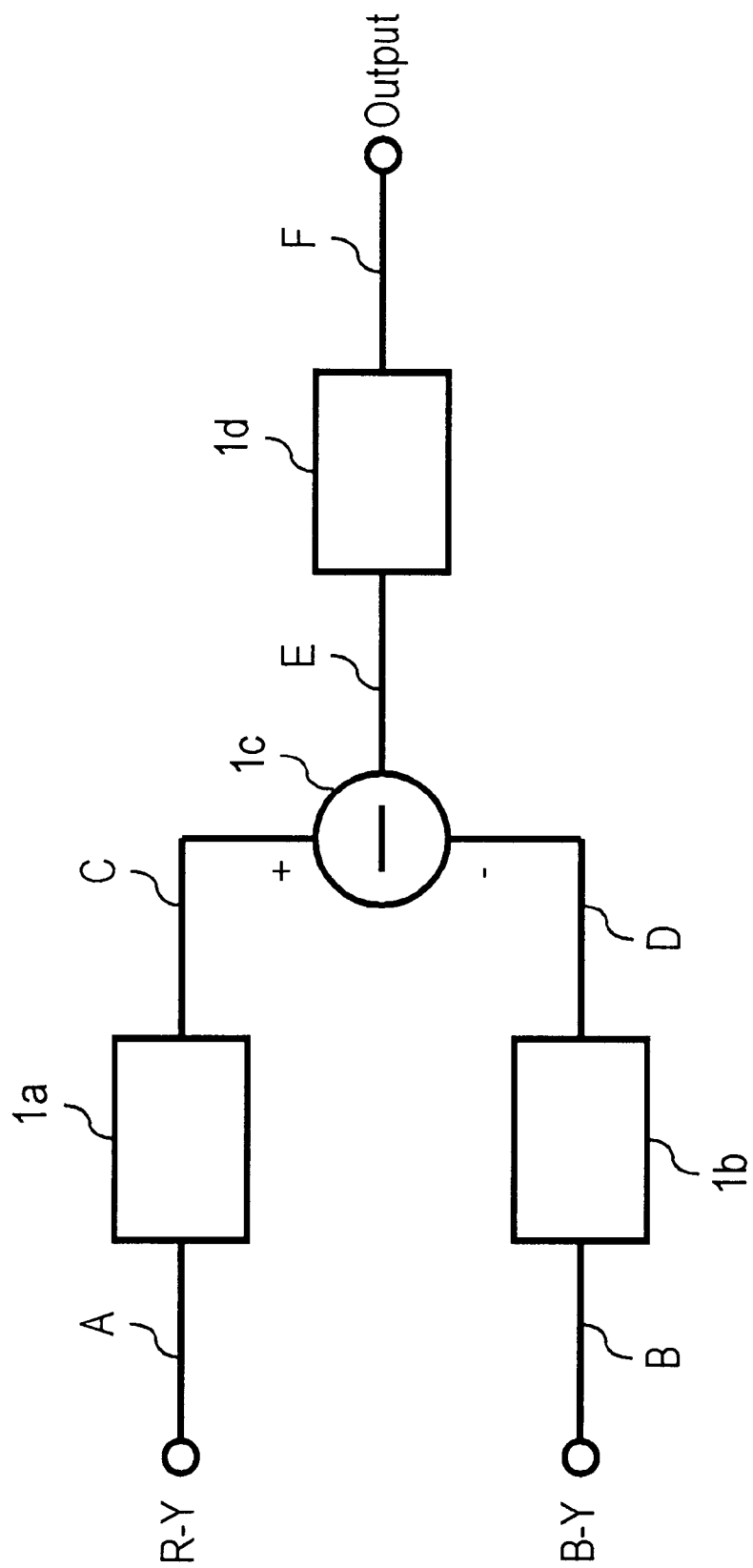
FIG. 1 is a block diagram of a pure red color detection circuit in accordance with an exemplary embodiment of the present invention.
Figure 2:
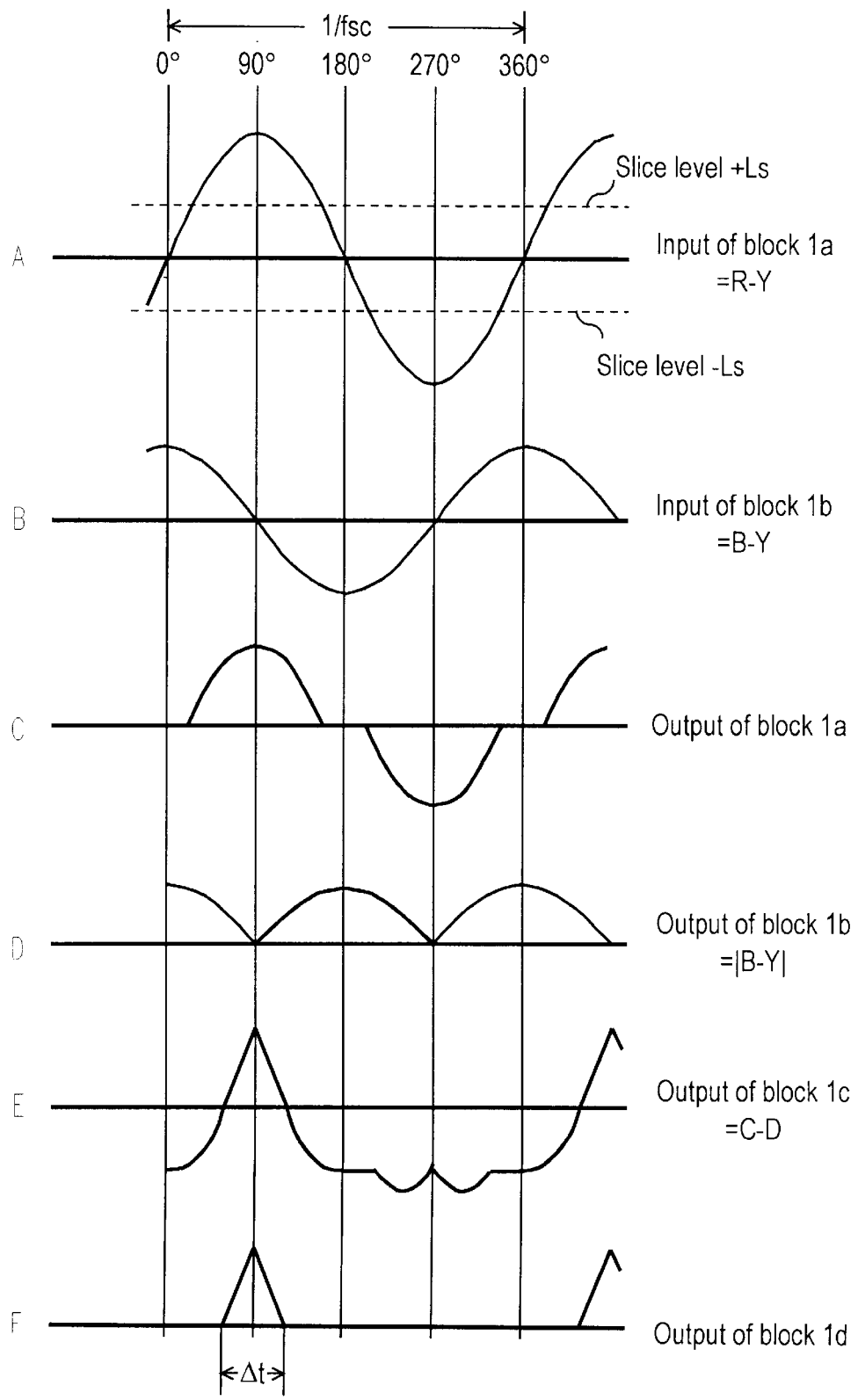
FIG. 2 shows waveforms at various points in a pure red color detection circuit in accordance with an exemplary embodiment of the present invention.
Figure 7:
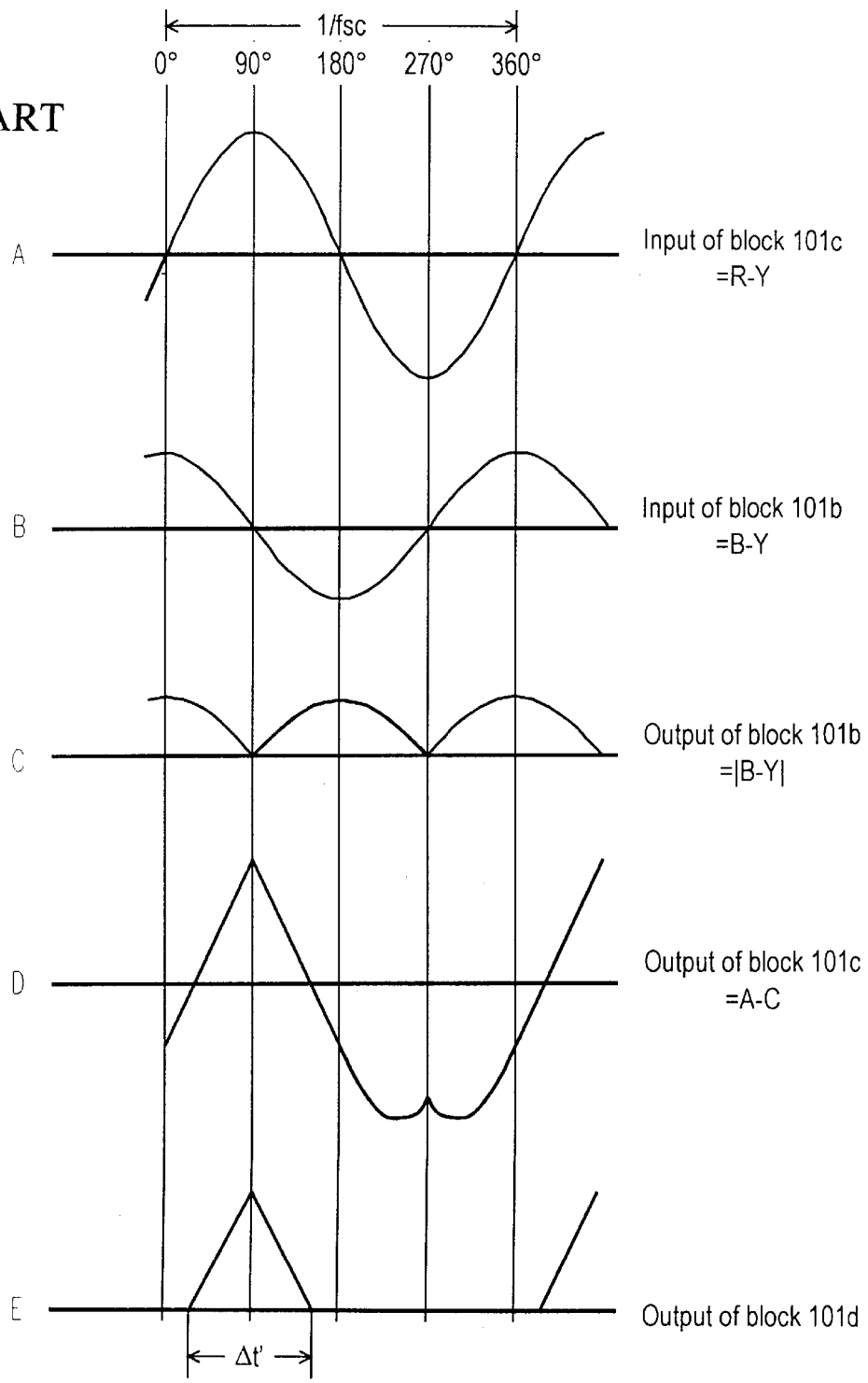
FIG. 7 shows waveforms at various points in a red color detection circuit in accordance with the prior art.
Figure 8:
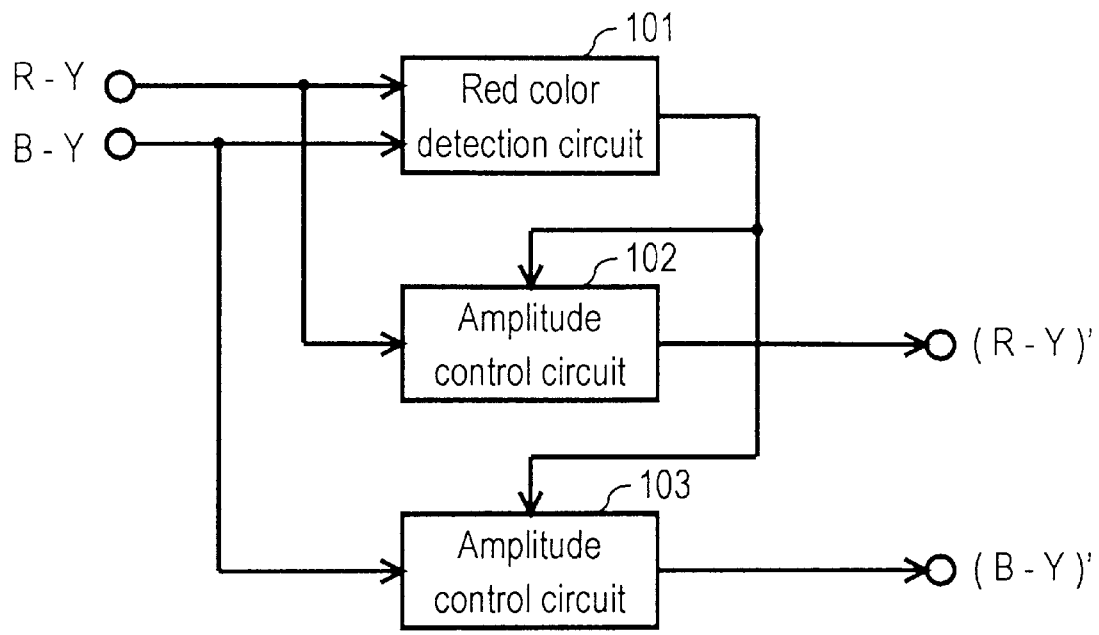
FIG. 8 is a block diagram of a color compensation circuit in accordance with the prior art.

The function of a pure red color detection circuit is explained below, referring to FIGS. 1 and 2. All the signals treated in the exemplary embodiments are digital data. A block diagram of a pure red color detection circuit of the present invention is shown in FIG. 1 and waveforms at various points in the pure red color detection circuit are expressed by analog signals as shown in FIG. 2. The pure red color detection circuit 1 includes a slice circuit 1*a*, an absolute value outputting circuit 1*b*, a subtracter 1*c* and a limiter 1*d*. In FIG. 2, waveforms A and B are color differential signals (R-Y) and (B-Y) supplied to the pure red detection circuit, respectively and the color differential signal (R-Y) is delayed from the color differential signal (B-Y) by 90 degrees in phase. The color differential signal (R-Y) is sliced at sliced levels +/–Ls at slice circuit 1*a* and a signal over the slice levels is output (waveform C in FIG. 2) and is supplied to a subtracter 1*c*. An absolute value B-Y is generated from the color differential signal (B-Y) at absolute value outputting circuit 1*b* (waveform D) and is supplied to subtracter 1*c*. The output of absolute value outputting circuit 1*b* (waveform D) is subtracted from the output of slice circuit 1*a* (waveform C) at subtracter 1*c* (waveform E) and only a positive part of the subtracted signal is output from limiter 1*d* (waveform F). The detected signal is narrower in width in the present invention than that of the prior art because of being added with a slice circuit (t indicated in waveform F, FIG. 2 of the present invention compared with t' indicated in waveform F, FIG. 7 of the prior art), and a signal concentrated near 90 degrees, expressing by a color phase, that is close to the (R-Y) axis is detected. As a result, a signal close to a pure red color contained in the input chrominance signal is detected.

Thus, according to the present invention, a purer red color can be detected by outputting a red color detection signal only from a chrominance signal including a red color signal higher than a designated slice level.

(Second exemplary embodiment)

Figure 3:
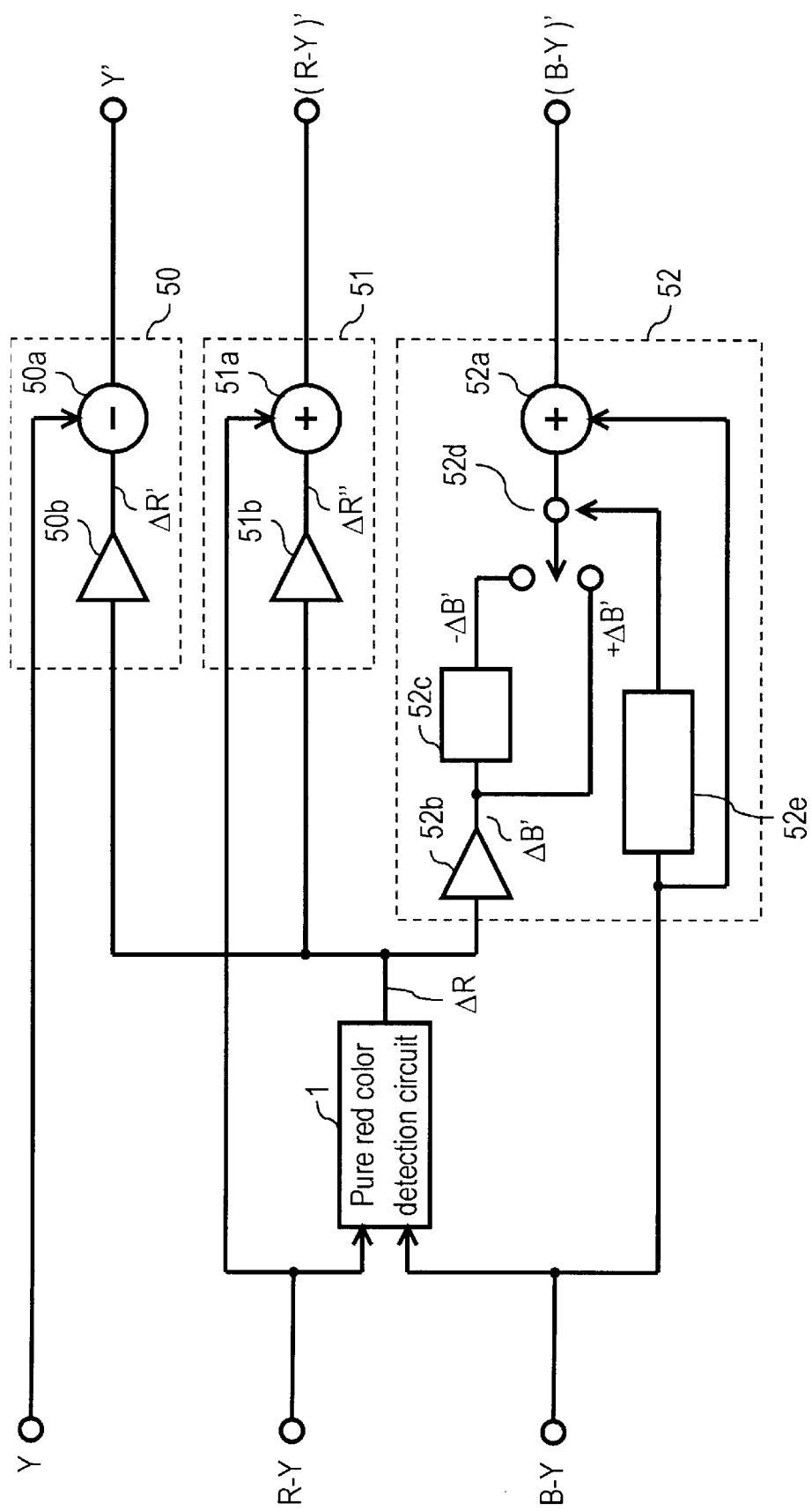
FIG. 3 is a block diagram of a color compensation circuit in accordance with an exemplary embodiment of the present invention.

The function of a color compensation circuit of the present invention is explained below, referring to a block diagram shown in FIG. 3. The color compensation circuit includes a pure red color detection circuit 1, a Y signal compensation block 50, an (R-Y) signal compensation block 51 and a (B-Y) signal compensation block 52. Y signal compensation block 50 includes a subtracter 50*a* and a gain controller 50*b*. (R-Y) signal compensation block 51 includes an adder 51*a* and a gain controller 51*b*. (B-Y) signal compensation block 52 includes an adder 52*a*, a gain controller 52*b*, a polarity inverter 52*c*, signal selection circuit 52*d* and a polarity discriminater 52*e*. Pure red color detection circuit 1 are supplied with color differential signals (R-Y) and (B-Y) and outputs a pure red detection signal R. The pure red color detection signal R is supplied to Y signal compensation block 50 and (R-Y) signal compensation block 51.

Pure red color detection signal R supplied to Y signal compensation block 50 is gain-controlled at gain controller 50*c* and is supplied to subtracter 50*a*. Subtracter 50*a* subtracts the gain-controlled pure red color detected signal R' from the luminance signal Y and outputs the result. The output signal is a luminance signal Y', the luminance of which corresponding to the pure red color part is somewhat suppressed.

Figure 4A:
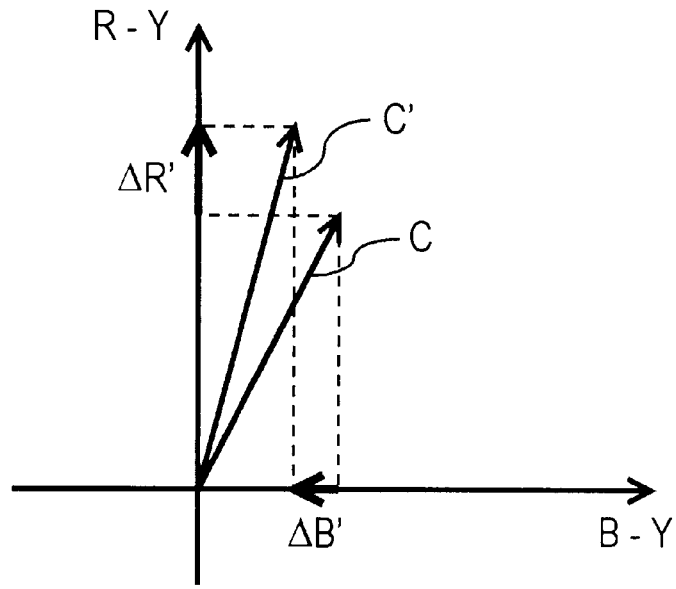
FIG. 4A shows color phase coordinates when the vector of a chrominance signal C is in a first quadrant.
Figure 4B:
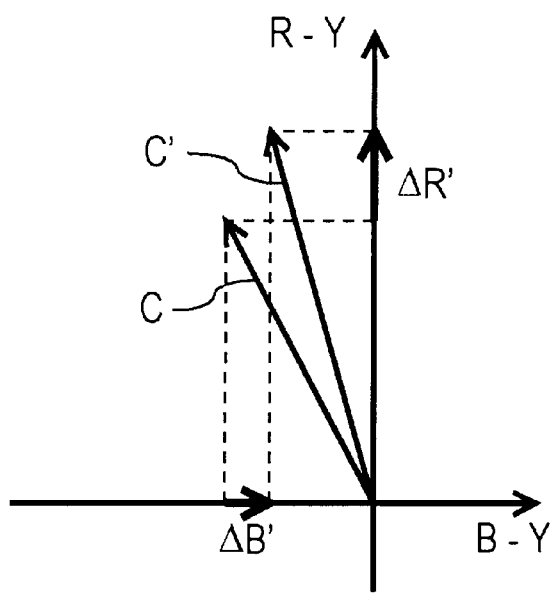
FIG. 4B shows color phase coordinates when the vector of a chrominance signal C is in a second quadrant.

Pure red color detection signal R supplied to (R-Y) signal compensation block 51 is gain-controlled at gain controller 51*c* and is supplied to adder 51*a*. Adder 51*a* adds the gain-controlled pure red color detected signal R' to the color differential signal (R-Y) and outputs the result. As shown in FIG. 4, adder 51*a* outputs a red color differential signal (R-Y)' with an increased amplitude, when the chrominance signal C is in a first quadrant (FIG. 4A) or in a second quadrant (FIG. 4B).

The output R of pure red color detection circuit 1 and the color differential signal (B-Y) are supplied to (B-Y) signal compensation block 52. The output R of pure red color detection circuit 1 is gain-controlled in gain controller 52*b* (B') and its polarity is inverted by polarity inverter 52*c* (–B'). Both signals before and after polarity inversion are supplied to a signal selection circuit 52*d*. The other input color differential signal (B-Y) of (B-Y) signal compensation block 52 is discriminated its polarity by polarity discriminater 52*e* and switches the connection in signal selection circuit 52*d*. Signal selection circuit 52*d* is controlled to select the output of polarity inverter 52*c* (connect to the upper terminal of the switch in FIG. 3) when polarity discriminater 52*e* judges that the input color differential signal (B-Y) is positive and to select the input of polarity inverter 52*c* (connect to the lower terminal of the switch in FIG. 3) when polarity discriminater 52*e* judges that the input (B-Y) signal is negative. Adder 52*a* adds the positive or negative pure red color detected signal (B' or –B') of signal selection circuit 52*d* to the input color differential signal (B-Y) and outputs the added signal. As shown in FIG. 4, when the chrominance signal C is in a first quadrant (FIG. 4A), in other words the color differential (B-Y) signal is positive, signal selection circuit 52*d* selects the output of polarity inverter 52*c* and (B-Y) signal compensation block 52 outputs the value corresponding to {(B-Y)–B'}. As a result, the amplitude of the (B-Y) signal decreases. When the chrominance signal C is in a second quadrant (FIG. 4B), in other words the color differential signal (B-Y) is negative, signal selection circuit 52*d* selects the input of polarity inverter 52*c* and (B-Y) signal compensation block 52 outputs the value corresponding to –{(B-Y)–B'}. As a result the amplitude of the (B-Y) signal also decreases.

As shown in FIG. 4, when the chrominance signal is in a first quadrant or in a second quadrant, the synthesized chrominance signal C' rotates to be close to the (R-Y) axis in phase, because the (R-Y) component increases and (B-Y) component decreases by using the pure red color detected signal. The Y/C ratio is decreased, because the level of the luminance signal Y is lowered by the pure red color detected signal for a red part. By lowering the luminance level for a red part and rotating, the phase of a color close to red towards the (R-Y) axis is realized. As a result, yellowish color included in red is eliminated and a red color with high purity is reproduced.

Figure 5:
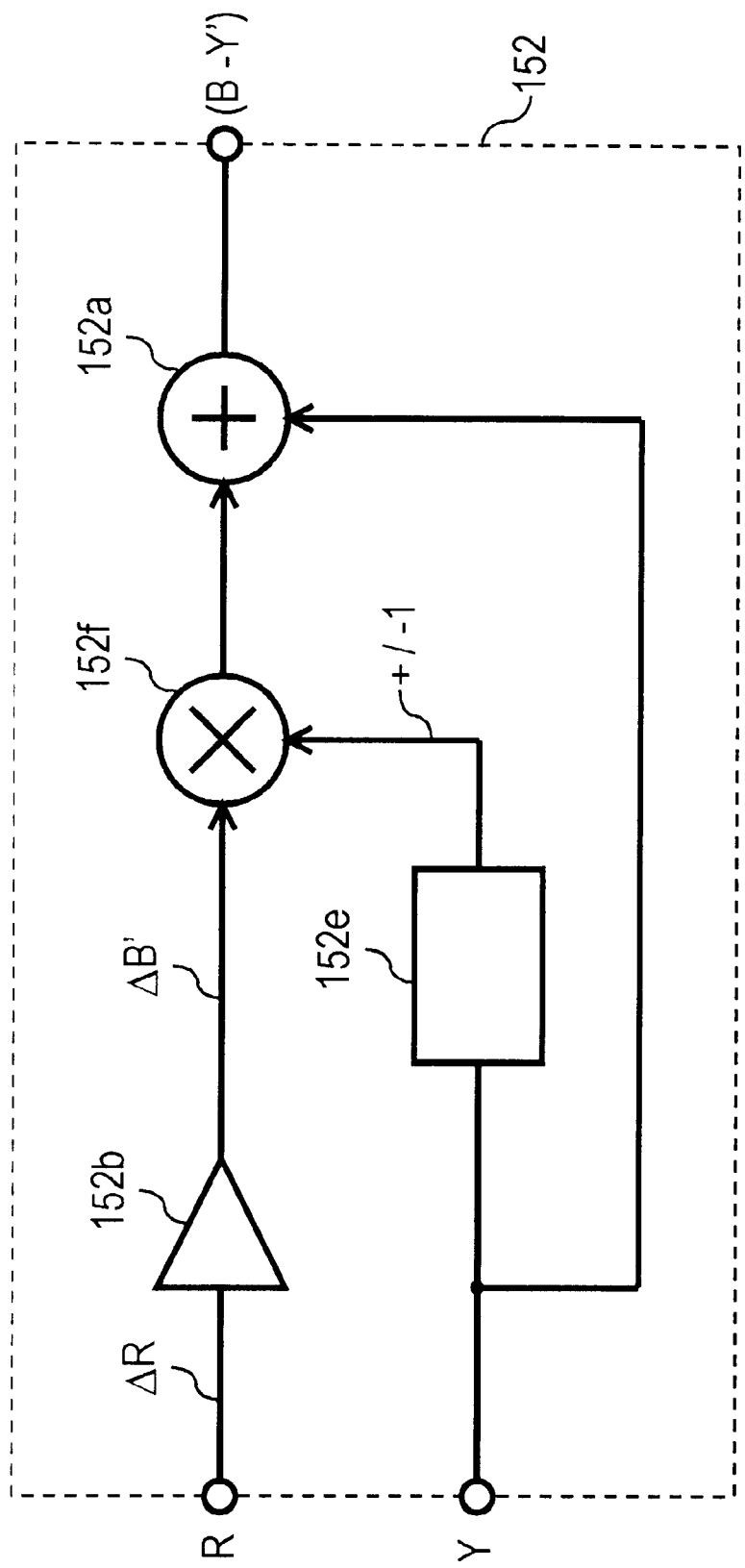
FIG. 5 is another block diagram of a (B-Y) signal compensating block of a color compensation circuit in accordance with an exemplary embodiment of the present invention.
Figure 6:
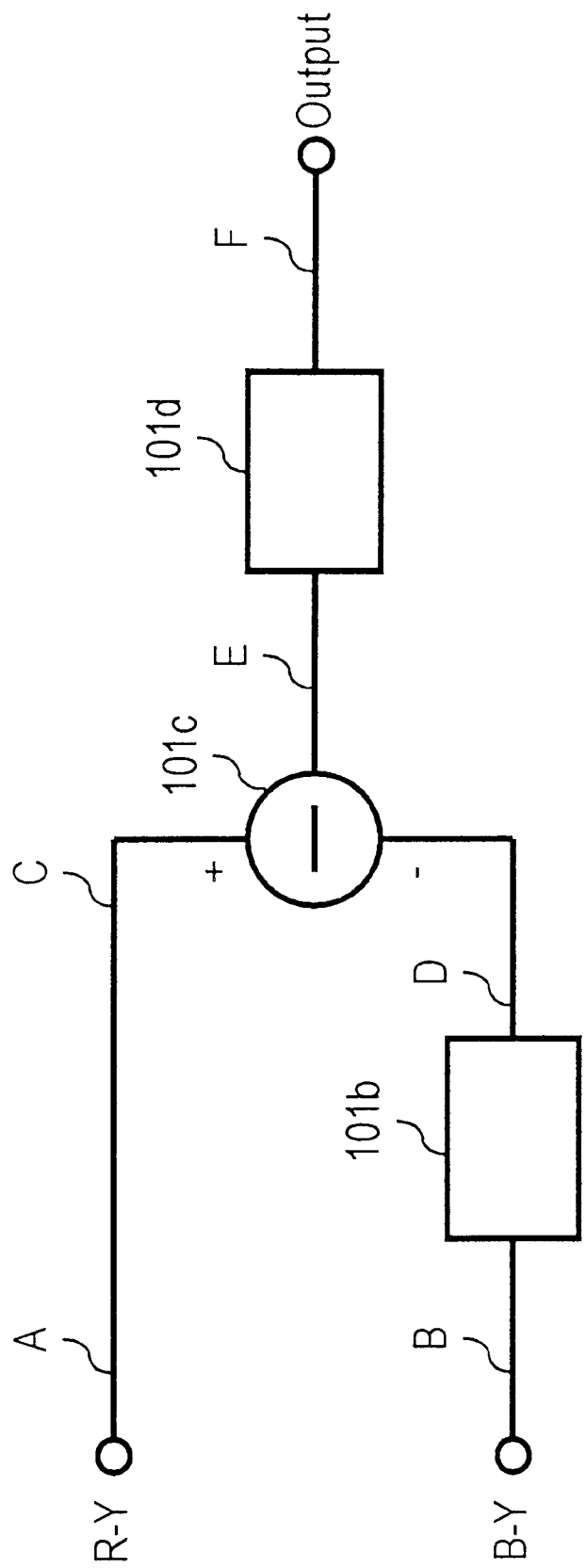
FIG. 6 is a block diagram of a red color detection circuit in accordance with the prior art.

A block diagram of another composition of a (B-Y) signal compensation block included in a color compensation circuit is shown in FIG. 5. The (B-Y) signal compensation block 152 includes an adder 152*a*, a gain controller 152*b*, a multiplier 152*f* and a polarity discriminater 152*e*.

The output R of pure red color detection circuit 1 and a (B-Y) signal are inputted to (B-Y) signal compensation block 152. The output of pure red color detection circuit 1 R is gain-controlled in gain controller 152*b* (B') and is supplied to multiplier 152*f*. On the other hand, the (B-Y) signal is discriminated its polarity in polarity discriminater 152*e* and if the (B-Y) signal is positive, a signal corresponding to –1 is outputted and if it is negative, a signal corresponding to +1 is outputted. The signals are supplied to multiplier 152*f*. The output B' of gain controller 152*b* is multiplied by the output of polarity discriminater 152e, i.e. the value corresponding to 1 in multiplier 152f and the multiplied output is supplied to adder 152a. Therefore, multiplier 152f works as a combination of a polarity inverter (52c in FIG. 3) and a signal selection circuit (52d in FIG. 3). Adder 152a adds the output of multiplier 152f to the other input (B-Y). Because multiplier 152f works as a combination of a polarity inverter (52c in FIG. 3) and a signal selection circuit (52d in FIG. 3), the (B-Y) signal compensation block 152 also has the same function as the above mentioned (B-Y) signal compensation block 52.

In the color phase coordinates shown in FIG. 4, if the chrominance signal is in a first quadrant (FIG. 4A), multiplier 152f outputs the value corresponding to −B' and (B-Y) signal compensation block 152 outputs the value corresponding to {(B-Y)−B'} so that the amplitude decreases. If the chrominance signal C is in a second quadrant (FIG. 4B), multiplier 152f outputs the value corresponding to +B' and (B-Y) signal compensation block 152 outputs the value corresponding to −{(B-Y)−B'} so that the amplitude also decreases.

INDUSTRIAL APPLICABILITY

Thus, according to the present invention, in the pure red color detection circuit, a pure red color signal can be detected by slicing a color differential signal (R-Y) at a designated slice level, subtracting an absolute value of the color differential signal (B-Y) from the sliced (R-Y) signal and taking out only the positive part of the subtracted signal.

In a color compensation circuit using the pure red color detection circuit, the chrominance signal C can be rotated closer to the (R-Y) axis. This improvement is performed by decreasing the level of the high saturated red part and decreasing a Y/C ratio for a luminance signal Y, and adding the pure red detection signal and increasing the amplitude for the color differential signal (R-Y) and decreasing the amplitude by the pure red detection signal for the color differential signal (B-Y).

In a color television receiver using the above mentioned circuit, saturation is prevented for a strong red part, yellowish color contained in red is eliminated, highly pure red is reproduced and a picture with excellent color reproducibility can be obtained.

REFERENCE NUMERALS

1 . . . red color detection circuit
1a . . . slice circuit
1b . . . absolute value outputting circuit
1c . . . subtracter
1d . . . limiter
50 . . . Y signal compensation block
51 . . . (R-Y) signal compensation block
52 . . . (B-Y) signal compensation block
50a . . . subtracter
51a, 52a, 152a . . . adder
50b, 51b, 52b . . . gain controller
52c . . . polarity inverter
52d . . . signal selection circuit
52e, 152e . . . polarity discrimination circuit
52f, 152f . . . multiplier

What is claimed is:

1. A pure red color detection circuit comprising:
slice means for inputting a color demodulated color-difference signal (R-Y) and for extracting an (R-Y) signal component at a slice level (Ls);
absolute value means for inputting a color demodulated color-difference signal (B-Y) and for outputting an absolute value component of said inputted color-difference signal (B-Y);
subtraction means for subtracting the absolute value component of the (B-Y) signal output from said absolute value means, from the (R-Y) signal at said slice level (Ls) and output from said slice means; and
limited means for removing a negative component of the signal output from said subtraction means and for outputting a red color component having an (R-Y) signal component in first and second quadrants.

2. A color compensation circuit comprising:
red color detection means for detecting a red component, using color difference signals (R-Y) and (B-Y); and
Y signal compensation means for compensating a Y signal, using the output signal of said red color detection means; and wherein
said Y signal compensation means comprises:
first gain control means for decreasing the output signal amplitude of said red color detection means; and
second subtraction means for subtracting the output signal of said first gain control means from the Y signal.

3. A color compensation circuit comprising:
red color detection means for detecting a red component, using color difference signals (R-Y) and (B-Y); and
(R-Y) signal compensation means for compensating said (R-Y) signal, using the output signal of said red color detection means; and wherein
said (R-Y) signal compensation means comprises:
second gain control means for controlling the output signal amplitude of said red color detection means; and
first addition means for adding said (R-Y) signal and the output signal of said second gain control means.

4. A color compensation circuit comprising:
pure red color detection means for inputting color demodulated (R-Y) and (B-Y) signal and detecting a red color from the (R-Y) and (B-Y) signals;
gain control means for controlling gain of a red detecting signal detected as said pure red color detection means and outputted from said pure red color detection means; and
addition means inputting an output signal from said gain control means and the (B-Y) signal and outputting a compensated (B-Y) signal as a (B-Y)' signal.

5. A color compensation circuit comprising:
pure red color detection means for inputting color demodulated (R-Y) and (B-Y) signals and for detecting a red color from the (R-Y) and (B-Y) signals;
first and second gain control means for controlling gain of a red detecting signal detected at said pure red color detection means and outputted from said pure red color detection means;
first addition means for inputting the output signal from said first gain control means and the (B-Y) signal and for outputting a compensated (B-Y) signal as a (B-Y)' signal; and
second addition means for inputting the output signal from said second gain control means and the (R-Y) signal and for outputting a compensated (R-Y) signal as a (R-Y)' signal.

6. A color compensation circuit comprising:
pure red color detecting means for detecting a red color component, using color-difference signals (R-Y) and (B-Y);

first, second and third gain control means for independently controlling gain of a signal detected at said pure red color detection means;

second subtraction means for inputting the signal output from said first gain control means and a Y signal and for subtracting the signal output from said second first gain control means from said Y signal;

first addition means inputting the signal output from said second gain control means and the (R-Y) signal; and second addition means inputting the signal output from said third gain control means and the (B-Y) signal; and said pure red color detection means includes:

slice means for inputting a color demodulated color-difference signal (R-Y) and for extracting an (R-Y) signal component at a slice level;

absolute value means for inputting a color demodulated color-difference signal (B-Y) and for outputting an absolute value component of said inputted color-difference signal (B-Y);

first subtraction means for subtracting the absolute value component of the (B-Y) signal output from said absolute value means, from the (R-Y) signal at said slice level and output from said slice means; and limiter means for removing a negative component of the signal output from said subtraction means and for outputting a red color component having an (R-Y) signal component in first and second quadrants.

7. A color compensation circuit comprising:

red color detection means for detecting a red component, using color differential signals (R-Y) and (B-Y); and (B-Y) signal compensation means for decreasing an absolute value of said color differential signal (B-Y), using the output signal of said red color detection means, wherein said (B-Y) signal compensation means includes:

third gain control means for decreasing the amplitude of the output signal of said red color detection means;

polarity discrimination means for judging an output signal polarity of said color difference signal (B-Y);

polarity inverting means for inverting the output signal polarity of said third gain control means;

signal selection means for outputting an output signal of said polarity inverting means if said color differential signal (B-Y) has a positive polarity and outputting an output signal of said third gain control means if said color difference signal (B-Y) has a negative polarity; and third addition means for adding the output signal of said signal selection means and said color difference signal (B-Y).

8. A color compensation circuit comprising:

red color detection means for detecting a red component, using color differential signals (R-Y) and (B-Y); and (B-Y) signal compensation means for decreasing an absolute value of said color differential signal (B-Y), using the output signal of said red color detection means, wherein said (B-Y) signal compensation means comprises:

third gain control means for decreasing the amplitude of the output signal of said red color detection means;

polarity discrimination means for judging the polarity of said color difference signal (B-Y) and outputting +1 or −1 signal;

multiplication means for multiplying the output signal of said third gain control means by the output signal of said polarity discrimination means; and third addition means for adding the output signal of said multiplication means and said (B-Y) signal.

9. A color compensation circuit as defined in claim 2, further including a pure red color detection circuit which comprises:

slice means for slicing a color difference signal (R-Y) with a designated slice level and outputting;

absolute value means for outputting an absolute value of a color difference signal (B-Y):

first subtraction means for subtracting the output signal of said absolute value means from the output signal of said slice means; and limiter means for removing a negative polarity part of the output signal of said first subtraction means.

10. A color compensation circuit as defined in claim 3, further including a pure red color detection circuit which comprises:

slice means for slicing a color difference signal (R-Y) with a designated slice level and outputting;

absolute value means for outputting an absolute value of a color difference signal (B-Y):

first subtraction means for subtracting the output signal of said absolute value means from the output signal of said slice means; and limiter means for removing a negative polarity part of the output signal of said first subtraction means.

11. A color compensation circuit as defined in claim 4, further including a pure red color detection circuit which comprises:

slice means for slicing a color differential signal (R-Y) with a designated slice level and outputting;

absolute value means for outputting a n absolute value of a color difference signal (B-Y):

first subtraction means for subtracting the output signal of said absolute value means from the output signal of said slice means; and limiter means for removing a negative polarity part of the output signal of said first subtraction means.

* * * * *